United States Patent
Wang et al.

(10) Patent No.: US 12,039,372 B1
(45) Date of Patent: Jul. 16, 2024

(54) CONTROL METHOD, SYSTEM AND DEVICE WITH EDGE CLOUD SERVICE STABILITY

(71) Applicant: Yantai University, Yantai (CN)

(72) Inventors: Yingjie Wang, Yantai (CN); Ying Zhao, Yantai (CN); Zhaowei Liu, Yantai (CN); Peiyong Duan, Yantai (CN)

(73) Assignee: Yantai University, Yantai (CN)

( * ) Notice: Subject to any disclaimer, the term of this patent is extended or adjusted under 35 U.S.C. 154(b) by 0 days.

(21) Appl. No.: 18/501,934

(22) Filed: Nov. 3, 2023

(30) Foreign Application Priority Data

Jan. 31, 2023 (CN) .......................... 202310047774.9

(51) Int. Cl.
| | |
|---|---|
| *G06F 9/50* | (2006.01) |
| *G06Q 10/06* | (2023.01) |
| *G06Q 30/02* | (2023.01) |
| *H04L 67/10* | (2022.01) |

(52) U.S. Cl.
CPC .......... *G06F 9/5027* (2013.01); *G06F 9/5072* (2013.01); *G06Q 10/06* (2013.01); *G06Q 30/02* (2013.01); *H04L 67/10* (2013.01)

(58) Field of Classification Search
CPC ..... G06F 9/5027; G06F 9/5072; G06Q 30/02; G06Q 10/06; H04L 67/10
See application file for complete search history.

(56) References Cited

U.S. PATENT DOCUMENTS

| | | | |
|---|---|---|---|
| 2010/0235285 A1* | 9/2010 | Hoffberg | G06Q 50/188 705/37 |
| 2018/0139726 A1* | 5/2018 | Choi | H04L 67/1082 |
| 2021/0014113 A1* | 1/2021 | Guim Bernat | H04L 41/0273 |
| 2021/0144517 A1* | 5/2021 | Guim Bernat | H04L 41/0869 |

FOREIGN PATENT DOCUMENTS

| | | |
|---|---|---|
| CN | 112511336 A | 3/2021 |
| CN | 113191581 A | 7/2021 |
| CN | 115190033 A | 10/2022 |
| CN | 115390946 A | 11/2022 |
| WO | 2022117233 A1 | 6/2022 |

OTHER PUBLICATIONS

Li et al., "A Novel Incentive Mechanism Based on Repeated Game in Fog Computing", 2021, IEEE, pp. 112-119 (Year: 2021).*
Zhan Nan; Xie Xiao, "Group Buying Websites Information Service Quality Optimization Based on Evolu-tionary Game Theory", Journal of Information Resources Management No. 04, Dec. 26, 2014.

* cited by examiner

*Primary Examiner* — Kenneth Tang

(57) ABSTRACT

Disclosed are a control method, system and device with edge cloud service stability. The control method comprises the following steps of: first step: acquiring quality data of a task executor, monitoring data of an edge server, reward data of a task requester and supervision data of a cloud platform; second step: establishing revenue functions of the task executor, the cloud platform, the task requester and the edge server to obtain replication dynamic equations; and third step: establishing a Jacobian matrix to obtain a system stabilization strategy. Through the combination of the cloud platform and the edge server, a transmission amount of remote data is reduced, a time delay of network transmission is reduced, and an operation cost of the network is reduced.

5 Claims, 5 Drawing Sheets

# CONTROL METHOD, SYSTEM AND DEVICE WITH EDGE CLOUD SERVICE STABILITY

CROSS REFERENCE TO RELATED APPLICATIONS

This application claims foreign priority of Chinese Patent Application No. 202310047774.9, filed on Jan. 31, 2023 in the China National Intellectual Property Administration, the disclosures of all of which are hereby incorporated by reference.

TECHNICAL FIELD

The present invention relates to the field of network information security control technologies, and is particularly a control method, system and device with edge cloud service stability.

BACKGROUND OF THE PRESENT INVENTION

With the rapid development of mobile Internet technology and social networking technology, an edge cloud service has greatly facilitated people's lifestyles. For example, mobile crowdsourcing is released to an individual or crowd network with a sensor task through people's existing mobile device interaction and participatory sensor network model to help professionals or the public to collect data, analyze information and share knowledge. Because the task can be executed only by carrying a smart device, a carrier of each smart device may become a task executor. With the development of science and technology and the popularity of the smart device, there are uses of the smart device almost everywhere, so that the mobile crowdsourcing has a large number of participants and potential participants.

At present, a popular distributed crowdsourcing platform comprises a real-time taxi service, a take-away ordering service, an errand delivery service, a question and answer service and the like. A task requester reaches an agreement with the task executor through the crowdsourcing platform to complete a crowdsourcing service process, so as to achieve a win-win situation for both transaction parties. Under the background of current fundamental framework of cloud computing, edge Internet devices with different functions cooperate closely with a server of a distributed large-scale data center through a sensor chip of the device.

The edge device may generate a large amount of data at a high speed and a low delay. However, in a process of trying to acquire various application services from the data center far away from the users, user terminal smart mobile devices in explosive growth not only increase a high load on a backbone network of an operator and greatly increase a network congestion probability, but also lead to a high time delay, thus being difficult to meet the requirements of the users for service quality. Meanwhile, because hundreds of millions of mobile sensing devices gradually join a mobile crowdsourcing platform for sensed tasks, a large amount of data flood into a center cloud server. This phenomenon not only poses challenges for the central cloud system architecture, but also poses a big challenge to the development of the mobile crowdsourcing platform.

In this context, with the continuous exponential increase of mobile devices in numbers, more and more people participate in the crowdsourcing process. These crowdsourcing participants engage in the process in different regions and at different times, and with the continuous expansion of coverages of task executors and crowdsensing tasks, the scope of crowdsourcing services has also been expanded, and data quality problems have become increasingly prominent. Therefore, in order to effectively improve the data quality on this basis, there are still the following problems: (1) Traditional spatiotemporal crowdsourcing requires uploading all data to the cloud platform for unified processing, it is difficult to guarantee that the cloud platform is a credible third party, and it is unable to guarantee that data will not be leaked, so that it is difficult to guarantee the privacy of users. (2) Most models are based on the assumption that both workers and task requesters are completely rational, which is often not achievable in real-life scenarios. (3) Uploading tasks to the cloud platform is difficult to meet low delay and high efficiency requirements in a current edge cloud environment. Traditional mobile crowdsourcing quality control methods also struggle to meet the real-time demands of spatiotemporal crowdsourcing in this context.

SUMMARY OF PRESENT INVENTION

The present invention aims to provide a control method, system and device with edge cloud service stability.

The present invention adopts a technical solution as follows.

The present invention provides a control method with edge cloud service stability, which comprises the following steps of:

first step: acquiring quality data of a task executor, monitoring data of an edge server, reward data of a task requester and supervision data of a cloud platform;

second step: establishing revenue functions of the task executor, the cloud platform, the task requester and the edge server to obtain replication dynamic equations; and third step: establishing a Jacobian matrix to obtain a system stabilization strategy.

According to the control method above, the operation of the third step specifically comprises: establishing the Jacobian matrix according to the replication dynamic equations of the task executor, the cloud platform, the task requester and the edge server to obtain local stable points, and screening the local stable points to obtain the system stabilization strategy.

The operation of screening the local stable points specifically comprises: calculating a corresponding eigenvalue of the local stable point, and when the eigenvalue is negative, the corresponding local stable point is the system stabilization strategy.

According to the control method above, the system stabilization strategy comprises:

a case 1 of: acquiring first quality data from the task executor, acquiring first supervision data from the cloud platform, acquiring second reward data from the task requester, and acquiring second monitoring data from the edge server;

a case 2 of: acquiring second quality data from the task executor, acquiring second supervision data from the cloud platform, acquiring first reward data from the task requester, and acquiring first monitoring data from the edge server; and a case 3 of: acquiring first quality data from the task executor, acquiring first supervision data from the cloud platform, acquiring first reward data from the task requester, and acquiring first monitoring data from the edge server.

According to the control method above, the replication dynamic equations comprise a replication dynamic equation F(r) of the task executor, a replication dynamic equation F(m) of the cloud platform, a replication dynamic equation F(p) of the task requester and a replication dynamic equation F(g) of the edge server, wherein, $$F(r)=dr/dt=r(W_1-\overline{W})=-r(r-1)(C_{li}-C_{hi}+R+S+pB_{rw}+mR_j+pR_h-pR_j-mpB_{rw}+mgR_h-mgR_j-gpR_h+gpR_j-mpR_h+mpR_j+mpgR_h-mpgR_j),$$

$$F(m)=dm/dt=m(C_1-\overline{C})=-m(m-1)(R-N_p+S+pB_{rw}+rB_{tq}-gpr^2-rpB_{tq}-rpB_{rw}-gpR-gvP_i-pvP_i+gpr+rpvP_i+rgpR+gpvP_i+rgvP_i-rgpvP_i)$$

$$F(p)=dp/dt=p(T_1-\overline{T})=-p(p-1)(R_q-P_i+S_q+rB_{tq}+gP_i-gR_h+gR_l+ mP_i-mR_q-mS_q+rP_i-rR_h+rR_l-rmB_{tq}-mgP_i+mgR_h-mgR_l-rgP_i+rgR_h-rgR_l-2rmP_i+rmR_q+rmS_q+2rmgP_i-rmgR_h+rmgR_l),$$

$$F(g)=-g(g-1)(Cle-Che+Pi+R+S+mChe-mCle-mPi-mR-mS-pPi-rPi-vPi-rmChe+rmCle+mpPi+rmPi+rmR+rmS+rpPi,+mvPi+pvPi+rvPi-mpvPi-rmvPi-rpvPi-rmpPi+rmpvPi)$$

r is a probability of provision of the first quality data by the task executor, t is time, m is a probability of provision of the first supervision data by the cloud platform, p is a probability of provision of the first reward data by the task requester, g is a probability of provision of the first monitoring data by the edge server, and a range of values of r, m, p and g is [0, 1];

$W_1$ is a revenue of provision of the first quality data by the task executor, and $\overline{W}$ is an average revenue of the task executor;

$C_1$ is a revenue of provision of the first supervision data by the cloud platform, and $\overline{C}$ is an average revenue of the cloud platform;

$T_1$ is a revenue of provision of the first reward data by the task requester, and $\overline{T}$ is an average revenue of the task requester;

$S_1$ is a revenue of provision of the first monitoring data by the edge server, and $\overline{S}$ is an average revenue of the edge server;

R is a reputation award, and S is a reputation loss;

$R_h$ is a reward acquired by provision of the first quality data by the task executor, $C_{hi}$ is a cost of provision of the first quality data by the task executor, $R_l$ a reward acquired by provision of the second quality data by the task executor, and $C_{li}$ is a cost of provision of the second quality data by the task executor;

$R_q$ is a reputation award acquired by provision of the first reward data by the task requester, $S_q$ is a reputation loss acquired by provision of the second reward data by the task requester, $P_i$ is a reward given to the cloud platform and the edge server by the task requester, $vP_i$ is a reward given to the cloud platform by the task requester, and $(1-v)P_i$ is a reward given to the edge server by the task requester; and $C_{he}$ is a cost of provision of the first monitoring data by the edge server, $C_{le}$ is a cost of provision of the second monitoring data by the edge server, $B_{rw}$ is a cost of collusion between the task executor and the cloud platform, $B_{tq}$ is a cost of collusion between the task requester and the cloud platform, and Np is a cost of discrimination of the cloud platform.

the average revenue of the task executor is $\overline{W}=rW_1+(1-r)W_2$, $$W_1=mpg(R_h+R-C_{hi})+m(1-p)g(R_h+R-C_{hi})+mp(1-g)(R_l+R-C_{hi})+m(1-p)(1-g)(R_l+R-C_{hi})+(1-m)pg(R_h+R-C_{hi})+(1-m)(1-p)g(R_l+R-C_{hi})+(1-m)p(1-g)(R_h+R-C_{hi})+(1-m)(1-p)(1-g)(R_l+R-C_{hi})$$

$$W_2=mpg(-C_{li}-S)+m(1-p)g(-C_{li}-S)+mp(1-g)(-C_{li}-S)+m(1-p)(1-g)(-C_{li}-S)+(1-m)pg(R_h-C_{li}-S-B_{rw})+(1-m)(1-p)g(R_l-C_{li}-S)+(1-m)p(1-g)(R_l-C_{li}-S-B_{rw})+(1-m)(1-p)(1-g)(R_l-C_{li}-S)$$

wherein $W_1$ is the revenue of provision of the first quality data by the task executor, and $W_2$ is a revenue of provision of the second quality data by the task executor;

the average revenue of the cloud platform is $\overline{C}=mC_1+(1-m)C_2$, $$C_1=rgp(vP_i+R-N_p)+rg(1-p)(vP_i+R-N_p)+r(1-g)p(vP_i+R-N_p)+r(1-g)(1-p)(vP_i+R-N_p)+(1-r)gp(r-N_p)+(1-r)g(1-p)(R-N_p)+(1-r)(1-g)p(R-N_p)+(1-r)(1-g)(1-p)(R-N_p)$$

$$C_2=rgp(vP_i-S)+rg(1-p)(vP_i-S-B_{tq})+r(1-g)p(vP_i-S)+r(1-g)(1-p)(vP_i-S-B_{tq})+(1-r)gp(vP_i-B_{rw}-S)+(1-r)g(1-p)(vP_i-S)+(1-r)(1-g)p(vP_i-B_{rw}-S)+(1-r)(1-g)(1-p)(-S)$$

wherein $C_1$ is the revenue of provision of the first supervision data by the cloud platform, and $C_2$ is a revenue of provision of the second supervision data by the cloud platform;

the average revenue of the task requester is $\overline{T}=pT_1+(1-p)T_2$, $$T_1=rmg(O_{ij}+R_q-P_i-R_h)+r(1-m)g(O_{ij}+R_q-P_i-R_h)+(1-r)(1-m)g(R_q-A_g-P_i-R_h)+rm(1-g)(O_{ij}+R_q-P_i-R_h)+r(1-m)(1-g)(O_{ij}+R_q-P_i-R_h)+(1-r)(1-m)(1-g)(R_q-A_g-P_i-R_l),$$

$$T_2=rmg(O_{ij}-P_i-S_q-R_l)+r(1-m)g(O_{ij}-P_i-B_{tq}-R_l-S_q)+(1-r)(1-m)g(-A_g-P_i-S_q-R_l)+rm(1-g)(Oi_j-S_q-R_l)+r(1-m)(1-g)(O_{ij}-P_i-R_l-S_q-B_{tq})+(1-r)(1-m)(1-g)(-A_g-S_q-R_l),$$

wherein $T_1$ is the revenue of provision of the first reward data by the task requester, $T_2$ is a revenue of provision of the second reward data by the task requester, $O_{ij}$ is a revenue brought to the task requester by the first quality data, and $A_g$ is a loss brought to the task requester by the second quality data; and the average revenue of the edge server is $\overline{S}=gS_1+(1-g)S_2$, $$S_1=rmp[(1-v)P_i+R-C_{he}]+r(1-m)p[(1-v)P_i+R-C_{he}]+(1-r)(1-m)p[(1-v)P_i+R-C_{he}]+rm(1-p)[(1-v)P_i+R-C_{he}]+r(1-m)(1-p)[(1-v)P_i+R-C_{he}]+(1-r)(1-m)(1-p)[(1-v)P_i+R-C_{he}]$$

$$S_2=rmp[(1-v)P_i-S-C_{le}]+r(1-m)p[(1-v)P_i-S-C_{le}]+(1-r)(1-m)p[(1-v)P_i-S-C_{le}]+rm(1-p)[(1-v)P_i-S-C_{le}]+r(1-m)(1-p)[(1-v)P_i-S-C_{le}]+(1-r)(1-m)(1-p)(-S-C_{le})$$

wherein $S_1$ is the revenue of provision of the first monitoring data by the edge server, and $S_2$ is a revenue of provision of the second monitoring data by the edge server.

The present invention provides a control system with edge cloud service stability, which comprises:

a task executor module configured for providing quality data and transmitting the quality data to an edge server;

a task requester module configured for providing reward data;

a cloud platform module configured for monitoring the task executor module and the task requester module and providing supervision data;

an edge server module configured for monitoring the quality data, providing the monitoring data, transmitting the quality data to the task requester module, and transmitting the reward data to the task executor module; and a control module configured for generating a system stabilization strategy based on the quality data, the reward data, the supervision data and the monitoring data.

The control module comprises:

an acquisition module for: acquiring quality data of a task executor, monitoring data of the edge server, reward data of a task requester and supervision data of a cloud platform;

a replication dynamic equation generation module for: establishing revenue functions of the task executor, the cloud platform, the task requester and the edge server to obtain replication dynamic equations; and a system stabilization strategy generation module for: establishing a Jacobian matrix to obtain a system stabilization strategy.

The present invention provides a control device with edge cloud service stability, which comprises a processor and a storage, wherein when the processor executes a computer program stored in the storage, the control method with edge cloud service stability above.

The present invention provides a computer-readable storage medium for storing a computer program, wherein when the computer program is executed by a processor, the control method with edge cloud service stability above.

The present invention has the beneficial effects as follows:

according to the control method with edge cloud service stability provided by the present invention, through the combination of the cloud platform and the edge server, a transmission amount of remote data is reduced, a time delay of network transmission is reduced, and an operation cost of the network is reduced while improving a user service quality; and according to the control method with edge cloud service stability provided by the present invention, four-party game analysis is carried out on the task executor, the cloud platform, the task requester and the edge server for the first time, so that a four-party selection condition of stable operation of an edge cloud service is obtained, which is namely the system stabilization strategy, and a total revenue of the edge cloud service is optimized.

DESCRIPTION OF THE DRAWINGS

By reading the following detailed description of preferred embodiments, solutions and advantages of the present application will be clear to those skilled in the art. The drawings are only for the purpose of illustrating the preferred embodiment, and are not considered as limiting the present invention.

In the drawings.

DETAILED DESCRIPTION OF PREFERRED EMBODIMENTS

Exemplary embodiments of the present disclosure will be described in detail hereinafter with reference to the drawings.

Figure 1:
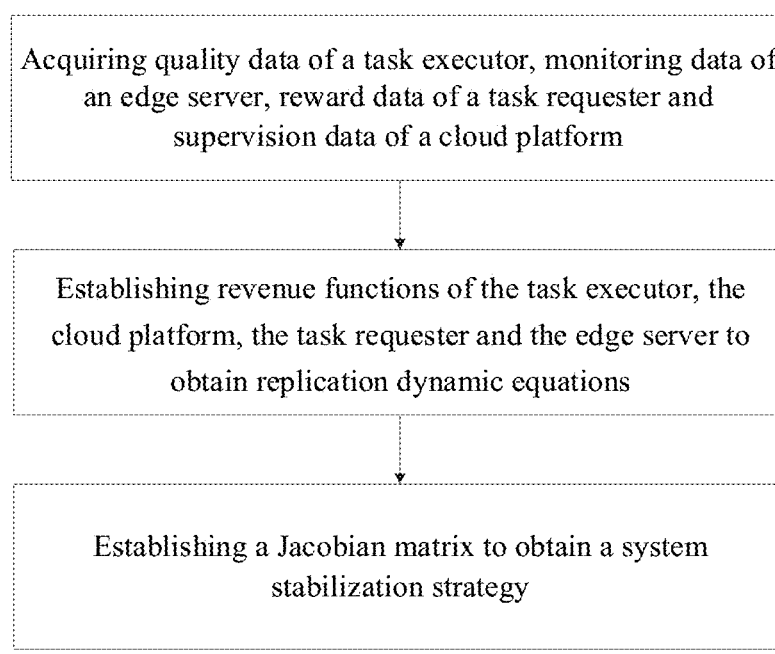
FIG. 1 is a flow chart of a control method in an embodiment.

A control method with edge cloud service stability, with reference to FIG. 1, comprises the following steps of:

first step: acquiring quality data of a task executor, monitoring data of an edge server, reward data of a task requester and supervision data of a cloud platform;

second step: establishing revenue functions of the task executor, the cloud platform, the task requester and the edge server to obtain replication dynamic equations; and third step: establishing a Jacobian matrix to obtain a system stabilization strategy.

Specifically:

In this embodiment, the task executor, the cloud platform, the task requester and the edge server are set to maintain the edge cloud service stability. The task requester sends a demand to the task executor through the edge server and provides reward data, the task executor sends quality data to the task requester through the edge server, the edge server is configured for monitoring the quality data and providing monitoring data, and the cloud platform supervises the task executor and the task requester and provides supervision data.

In a traditional edge cloud service, such as a crowdsourcing system, there are three main roles: the task requester, the task executor and the cloud platform, and the task requester interacts with the task executor through the cloud platform. However, with the widespread use of the edge cloud service, a large amount of interactive information floods into the cloud platform, which can greatly increase a task load of the cloud platform, thus being not beneficial for the stable operation of the edge cloud service, and being easy to cause the collapse of the edge cloud service.

In order to reduce a computing task load of the cloud platform to prevent a traditional edge cloud service from collapsing due to excessive processing, the edge server is selected as an interactive hub between the task requester and the task executor in this embodiment. That is, the task requester sends the demand to the edge server, after accepting the demand of the task requester, the edge server transmits the demand to the task executor meeting conditions, and after receiving the demand, the task executor will transmit the processed quality data to the task requester through the edge server, and the edge server may also monitor the quality data provided by the task executor. The flexibility and expandability of the edge server enable the task requester and the task executor to deploy the information on the edge server of the network, so that a business is localized, thus greatly reducing a transmission amount of remote data, reducing a transmission delay of the network, and reducing an operation cost of the network and alleviating a computing pressure of the cloud platform while improving a user service quality.

However, due to the potential selfishness of the task executor, the task executor often aims for higher reward through a minimum effort, leading to possible false claims regarding data quality. If the edge server selects to favor the task executor at the moment, low-quality data will be transmitted to the task requester, and if the task requester selects to trust the low-quality data and provides a corresponding reward, a cost of the task requester can be increased. Certainly, the task requester may also be selfish, and after receiving the data quality, the task requester may deliberately undervalue the data quality, provide a false evaluation report, and fail to provide the reward according to the quality data, thus reducing a payment cost. At the moment, the edge server selects to favor the task requester, the edge server will transmit the false evaluation report and the corresponding reward to the task executor, and a revenue of the task executor can be reduced at the moment. The two cases above comprise other consequences of game among the task requester, the task executor and the edge server, all of which are not beneficial for the stable operation of the edge cloud service.

In order to ensure the operation of the edge cloud service, the cloud platform is provided in this embodiment for supervising the task requester and the task executor, and supervising whether both parties have a cheating behavior. Because the task executor and the task requester are supervised by the cloud platform, the task executor and the task requester have to provide true quality data and reward data, which can enhance credibilities of both parties, thus further enhancing the edge cloud service stability.

Certainly, the cloud platform may also be unfair in a process of using the edge cloud service. The following two cases are manifested. In a first case, the cloud platform colludes with the task executor, and the task executor selects to provide the low-quality data. In a second case, the cloud platform colludes with the task requester, and the task requester does not truthfully provide the reward data according to the quality data. The two cases above may not be beneficial for the stable operation of the edge cloud service.

In order to further ensure the edge cloud service stability, it is necessary to balance the game among the task requester, the edge server, the task executor and the cloud platform.

In order to solve this problem, in this embodiment, on the premise that the task executor provides different quality data, revenue matrices of the game among the four parties when the task requester provides different reward data, the edge server provides different monitoring data and the cloud platform provides different supervision data are established respectively, revenue functions of the task executor, the cloud platform, the task requester and the edge server are obtained, and then replication dynamic equations of the four parties are obtained respectively. Then, according to the replication dynamic equations of the four parties, the Jacobian matrix is established and calculated, and the system stabilization strategy is obtained.

Specifically, according to different selections of the task executor, the cloud platform, the task requester and the edge server, costs and incomes are calculated respectively, and then revenue matrices of the four parties are established respectively (referring to Table 1).

A probability of provision of first quality data (credible) by the task executor is r, which means that the task executor provides high-quality data, and the first quality data are called the high-quality data below. A probability of provision of second quality data (non-credible) by the task executor is 1-r, which means that the task executor provides low-quality data, and the second quality data are called the low-quality data below. The first quality data are superior to the second quality data in data quality.

A probability of provision of first supervision data (credible) by the cloud platform is m, which means that the cloud platform selects strict supervision, and the first supervision data are called strict supervision data below. A probability of provision of second supervision data (non-credible) by the cloud platform is 1-m, which means that the cloud platform selects non-strict supervision, and the second supervision data are called non-strict supervision data below. The supervision of the cloud platform in the first supervision data is stricter than that in the second supervision data.

A probability of provision of first reward data (credible) by the task requester is p, which means that the task requester truthfully provides a reward according to the quality data, and the first reward data are called true reward data below. A probability of provision of second reward data (non-credible) by the task requester is 1-p, which means that the task requester does not truthfully provide the reward according to the quality data, and the second reward data are called false reward data below. The first reward data are superior to the second reward data in reward truthfulness.

A probability of provision of first monitoring data (credible) by the edge server is g, which means that the edge server strictly monitors the quality data, and the first monitoring data are called strict monitoring data below. A probability of provision of second monitoring data (non-credible) by the edge server is 1-g, which means that the edge server does not strictly monitor the quality data, and the second monitoring data are called non-strict monitoring data below. A monitoring degree of the edge server in the first reward data is stricter than that in the second reward data.

A range of values of r, m, p and g is [0, 1].

An attribute set of the task executor is <$R_h$, R, $C_{hi}$, $O_{ij}$, $R_l$, S, $C_{li}$, $A_g$, L>, wherein $R_h$ is a reward acquired by provision of the high-quality data by the task executor, $C_{hi}$ is a cost (comprising a power consumption, time, a communication expense, and the like) of provision of the high-quality data by the task executor, and $O_{ij}$ is a revenue brought by the high-quality data to the task requester. $R_l$ is a reward acquired by provision of the low-quality data by the task executor, $C_{li}$ is a cost of provision of the low-quality data by the task executor; and $A_g$ is a loss brought to the task requester by the low-quality data.

An attribute set of the task requester is <$R_q$, $S_q$, $P_i$>, wherein the task requester provides the true reward data to obtain a reputation award $R_q$, otherwise a reputation loss $S_q$ is obtained, and the task requester gives a reward $P_i$ to the cloud platform and the edge server. A reward of the cloud platform is v$P_i$, and a reward of the edge server is (1−v)$P_i$.

An attribute set of the edge server is <$C_{he}$, R, $C_{le}$, S, L>, wherein $C_{he}$ is a cost of provision of the strict monitoring data by the edge server, and $C_{le}$ is a cost of provision of the non-strict monitoring data by the edge server.

An attribute set of the cloud platform is <$N_p$, $B_{tw}$, $B_{tq}$, L>, wherein $N_p$ is a cost of monitoring of the cloud platform, and the task requester and the task executor are not always honest in real life and may collude with the cloud platform, thus reducing the monitoring degree of the platform, $B_{tw}$ is a cost of collusion between the task executor and the cloud platform, $B_{tq}$ is a cost of collusion between the task requester and the cloud platform, and L is a cost of communication between the edge server, and the task executor and cloud platform.

R is a reputation award, and S is a reputation loss.

TABLE 1

Summary table of revenue matrices of four parties

|  |  |  | The edge server is credible (g) | | The edge server is non-credible (1-g) | |
| --- | --- | --- | --- | --- | --- | --- |
|  | Strategy selection | Cloud platform | The task requester is credible (p) | The task requester is non-credible (1-p) | The task requester is credible (p) | The task requester is non-credible (1-p) |
| Task executor | High quality data (r) | Credible (m) | $R_h + R\text{-}C_{hi}$, $vP_i + R\text{-}N_p$, $O_{ij} + R_q\text{-}P_i\text{-}R_h$, $(1\text{-}v)P_i + R\text{-}C_{he}$ | $R_h + R\text{-}C_{hi}$, $vP_i + R\text{-}N_p$, $O_{ij}\text{-}P_i\text{-}S_q\text{-}R_l$, $(1\text{-}v)P_i + R\text{-}C_{he}$ | $R_h + R\text{-}C_{hi}$, $vP_i + R\text{-}N_p$, $O_{ij} + R_q\text{-}P_i\text{-}R_h$, $(1\text{-}v)P_i\text{-}S\text{-}C_{le}$ | $R_l + R\text{-}C_{hi}$, $vP_i + R\text{-}N_p$, $O_{ij}\text{-}S_q\text{-}R_l$, $(1\text{-}v)P_i\text{-}S\text{-}C_{le}$ |
|  |  | Non-credible (1-m) | $R_h + R\text{-}C_{hi}$, $vP_i\text{-}S$, $O_{ij} + R_q\text{-}P_i\text{-}R_h$, $(1\text{-}v)P_i + R\text{-}C_{he}$ | $R_l + R\text{-}C_{hi}$, $vP_i\text{-}S\text{-}B_{tq}$, $O_{ij}\text{-}P_i\text{-}B_{tq}\text{-}R_l\text{-}S_q$, $R + (1\text{-}v)P_i\text{-}C_{he}$ | $R_h + R\text{-}C_{hi}$, $vP_i\text{-}S$, $O_{ij} + R_q\text{-}P_i\text{-}R_h$, $(1\text{-}v)P_i\text{-}S\text{-}C_{le}$ | $R_l + R\text{-}C_{hi}$, $vP_i\text{-}S\text{-}B_{tq}$, $O_{ij}\text{-}P_i\text{-}R_l\text{-}S_q\text{-}B_{tq}$, $(1\text{-}v)P_i\text{-}S\text{-}C_{le}$ |
|  | Low quality data (1-r) | Credible (m) | $-C_{li}\text{-}S$, $R\text{-}N_p$, 0, 0 | $-C_{li}\text{-}S$, $R\text{-}N_p$, 0, 0 | $-C_{li}\text{-}S$, $R\text{-}N_p$, 0, 0 | $-C_{li}\text{-}S$, $R\text{-}N_p$, 0, 0 |
|  |  | Non-credible (1-m) | $R_h\text{-}C_{li}\text{-}S\text{-}B_{tw}$, $vP_i\text{-}B_{tw}\text{-}S$, $R_q\text{-}A_g\text{-}P_i\text{-}R_h$, $(1\text{-}v)P_i + R\text{-}C_{he}$ | $R_l\text{-}C_{li}\text{-}S$, $vP_i\text{-}S$, $-A_g\text{-}P_i\text{-}S_q\text{-}R_l$, $(1\text{-}v)P_i + R\text{-}C_{he}$ | $R_h\text{-}C_{li}\text{-}S\text{-}B_{tw}$, $vP_i\text{-}B_{tw}\text{-}S$, $R_q\text{-}A_g\text{-}P_i\text{-}R_l$, $(1\text{-}v)P_i\text{-}S\text{-}C_{le}$ | $R_l\text{-}C_{li}\text{-}S$, $-S$, $-A_g\text{-}S_q\text{-}R_l$, $-S\text{-}C_{le}$ |

Subsequently, based on the revenue matrices of the four parties, the revenue functions of the four parties under different selections are obtained, then average revenue functions are obtained, and then the replication dynamic equations of the revenues of the four parties are obtained by a replication dynamic method as follows.

The revenue functions of the task executor are shown in Formula (1) and Formula (2) respectively:

$$W_1 = mpg(R_h+R\text{-}C_{hi})+m(1\text{-}p)g(R_h+R\text{-}C_{hi})+mp(1\text{-}g)(R_l+R\text{-}C_{hi})+m(1\text{-}p)(1\text{-}g)(R_l+R\text{-}C_{hi})+(1\text{-}m)pg(R_h+R\text{-}C_{hi})+(1\text{-}m)(1\text{-}p)g(R_h+R\text{-}C_{hi})+(1\text{-}m)p(1\text{-}g)(R_h+R\text{-}C_{hi})+(1\text{-}m)(1\text{-}p)(1\text{-}g)(R_l+R\text{-}C_{hi}) \quad (1)$$

$$W_2 = mpg(-C_{li}\text{-}S)+m(1\text{-}p)g(-C_{li}\text{-}S)+mp(1\text{-}g)(-C_{li}\text{-}S)+m(1\text{-}p)(1\text{-}g)(-C_{li}\text{-}S)+(1\text{-}m)pg(R_h\text{-}C_{li}\text{-}S\text{-}B_{tw})+(1\text{-}m)(1\text{-}p)g(R_l\text{-}C_{li}\text{-}S)+(1\text{-}m)p(1\text{-}g)(R_l\text{-}C_{li}\text{-}S\text{-}B_{tw})+(1\text{-}m)(1\text{-}p)(1\text{-}g)(R_l\text{-}C_{li}\text{-}S) \quad (2)$$

wherein $W_1$ is a revenue of provision of the high-quality data (credible) by the task executor, $W_2$ is a revenue of provision of the low-quality data (non-credible) by the task executor, and t is time. Based on $W_1$ and $W_2$, an average revenue $\overline{W}$ of the task executor is obtained as shown in Formula (3):

$$\overline{W} = rW_1 + (1-r)W_2 \quad (3)$$

Further, a replication dynamic equation F(r) of the task executor is obtained as shown in Formula (4):

$$F(r) = dr/dt = r(W_1 - \overline{W}) = -r(r-1)(C_{li}-C_{hi}+R+S+pB_{tw}+mR_l+pR_h-pR_l-mpB_{tw}+mgR_h-mgR_l-gpR_h+pgR_l-mpR_h+mpR_l+mpgR_h-mpgR_l) \quad (4)$$

The revenue functions of the task executor are shown in Formula (5) and Formula (6) respectively:

$$C_1 = rgp(vP_i+R\text{-}N_p)+rg(1-p)(vP_i+R\text{-}N_p)+r(1-g)p(vP_i+R\text{-}N_p)+r(1-g)(1-p)(vP_i+R\text{-}N_p)+(1-r)gp(r-N_p)+(1-r)g(1-p)(R-N_p)+(1-r)(1-g)p(R-N_p)+(1-r)(1-g)(1-p)(R-N_p) \quad (5)$$

$$C_2 = rgp(vP_i-S)+rg(1-p)(vP_i-S-B_{tq})+r(1-g)p(vP_i-S)+r(1-g)(1-p)(vP_i-S-B_{tq})+(1-r)gp(vP_i-B_{tw}-S)+(1-r)g(1-p)(vP_i-S)+(1-r)(1-g)p(vP_i-B_{tw}-S)+(1-r)(1-g)(1-p)(-S) \quad (6)$$

wherein $C_1$ is a revenue of provision of the strict supervision data (credible) by the cloud platform, and $C_2$ is a revenue of provision of the non-strict supervision data (non-credible) by the cloud platform. Based on $C_1$ and $C_2$, an average revenue $\overline{C}$ of the cloud platform is obtained as shown in Formula (7):

$$\overline{C} = mC_1 + (1-m)C_2 \quad (7)$$

Further, a replication dynamic equation F(m) of the cloud platform is obtained as shown in Formula (8):

$$F(m) = dm/dt = m(C_1 - \overline{C}) = -m(m-1)(R-N_p+S+pB_{tw}+rB_{tq}-gpr^2-rpB_{tq}-rpB_{tw}-gpR-gvP_i-pvP_i+gpr+rpvP_i+rgpR+gpvP_i+rgvP_i-rgpvP_i) \quad (8)$$

The revenue functions of the task requester are shown in Formula (9) and Formula (10) respectively:

$$T_1 = rmg(O_{ij}+R_q-P_i-R_h)+r(1-m)g(O_{ij}+R_q-P_i-R_h)+(1-r)(1-m)g(R_q-A_g-P_i-R_h)+rm(1-g)(O_{ij}+R_q-P_i-R_h)+r(1-m)(1-g)(O_{ij}+R_q-P_i-R_h)+(1-r)(1-m)(1-g)(R_q-A_g-P_i-R_l) \quad (9)$$

$$T_2 = rmg(O_{ij}-P_i-S_q-R_l)+r(1-m)g(O_{ij}-P_i-B_{tq}-R_l-S_q)+(1-r)(1-m)g(-A_g-P_i-S_q-R_l)+rm(1-g)(O_{ij}-S_q-R_l)+r(1-m)(1-g)(O_{ij}-P_i-R_l-S_q-B_{tq})+(1-r)(1-m)(1-g)(-A_g-S_q-R_l) \quad (10)$$

wherein $T_1$ is a revenue of provision of the true reward data (credible) by the task requester, and $T_2$ is a revenue of provision of the false reward data (non-credible) by the task requester. Based on $T_1$ and $T_2$, an average revenue $\overline{T}$ of the task requester is obtained as shown in Formula (11):

$$\overline{T} = pT_1 + (1-p)T_2 \quad (11)$$

Further, a replication dynamic equation F(p) of the task requester is obtained as shown in Formula (12):

$$F(p) = dp/dt = p(T_1 - \overline{T}) = -p(p-1)(R_q-P_i+S_q+rB_{tq}+gP_i-gR_h+gR_l+mP_i-mR_q-mS_q+rP_i-rR_h+rR_l-rmB_{tq}-mgP_i+mgR_h-mgR_l-rgP_i+rgR_h-rgR_l-2rmP_i+rmR_q+rmS_q+2rmgP_i-rmgR_h+rmgR_l) \quad (12)$$

The revenue functions of the edge server are shown in Formula (13) and Formula (14) respectively:

$$S_1 = rmp[(1-v)P_i+R-C_{he}]+r(1-m)p[(1-v)P_i+R-C_{he}]+(1-r)(1-m)p[(1-v)P_i+R-C_{he}]+rm(1-p)[(1-v)P_i+R-C_{he}]+r(1-m)(1-p)[(1-v)P_i+R-C_{he}]+(1-r)(1-m)(1-p)[(1-v)P_i+R-C_{he}] \quad (13)$$

$$S_2 = rmp[(1-v)P_i-S-C_{le}]+r(1-m)p[(1-v)P_i-S-C_{le}]+(1-r)(1-m)p[(1-v)P_i-S-C_{le}]+rm(1-p)[(1-v)P_i-S-C_{le}]+r(1-m)(1-p)[(1-v)P_i-S-C_{le}]+(1-r)(1-m)(1-p)(-S-C_{le}) \quad (14)$$

wherein $S_1$ is a revenue of provision of the strict monitoring data (credible) by the edge server, and $S_2$ is a revenue of provision of the non-strict monitoring data (non-credible) by the edge server. Based on $S_1$ and $S_2$, an average revenue $\overline{S}$ of the task requester is obtained as shown in Formula (15):

$$\overline{S} = gS_1 + (1-g)S_2 \quad (15)$$

Further, a replication dynamic equation F(g) of the task requester is obtained as shown in Formula (16):

$$F(g)=-g(g-1)(Cle-Che+Pi+R+S+mChe-mCle-mPi-mR-mS-pPi-rPi-vPi-rmChe+rmCle+mpPi+rmPi+rmR+rmS+rpPi+mvPi+pvPi+rvPi-mpvPi-rmvPi-rpvPi-rmpPi+rmpvPi) \quad (16)$$

In order to obtain the system stabilization strategy of the edge cloud service, the system stabilization strategy is obtained based on the replication dynamic equations of the task executor, the task requester, the edge server and the cloud platform.

Specifically, according to the replication dynamic equations, the Jacobian matrix of the evolutionary game among the task executor, the cloud platform, the task requester and the edge server is obtained as follows:

$$J = \begin{bmatrix} J1 & J2 & J3 & J4 \\ J5 & J6 & J7 & J8 \\ J9 & J10 & J11 & J12 \\ J13 & J14 & J15 & J16 \end{bmatrix} =$$

$$\begin{bmatrix} \partial F(r)/\partial r & \partial F(r)/\partial m & \partial F(r)/\partial p & \partial F(r)/\partial g \\ \partial F(m)/\partial r & \partial F(m)/\partial m & \partial F(m)/\partial p & \partial F(m)/\partial g \\ \partial F(g)/\partial r & \partial F(g)/\partial m & \partial F(g)/\partial p & \partial F(g)/\partial g \\ \partial F(p)/\partial r & \partial F(p)/\partial m & \partial F(p)/\partial p & \partial F(p)/\partial g \end{bmatrix}$$

Subsequently, the Jacobian matrix is calculated to obtain local stable points, and the local stable points are screened to obtain the system stabilization strategy.

Specifically, F(r)=0, F(m)=0, F(p)=0, and F(g)=0, and then the local stable points may be obtained: $E_1(0,0,0,0)$, $E_2(0,0,0,1)$, $E_3(0,0,1,0)$, $E_4(0,1,0,0)$, $E_5(1,0,0,0)$, $E_6(1,1,0,0)$, $E_7(1,0,1,0)$, $E_8(1,0,0,1)$, $E_9(0,1,1,0)$, $E_{10}(0,1,0,1)$, $E_{11}(0,0,1,1)$, $E_{12}(1,1,1,0)$, $E_{13}(1,1,0,1)$, $E_{14}(1,0,1,1)$, $E_{15}(0,1,1,1)$ and $E_{16}(1,1,1,1)$, wherein a, b, c and d represent the selections of the task executor, the cloud platform, the task requester and the edge server sequentially, 0 refers to the selection of being credible, and 1 refers to the selection of being non-credible.

In order to obtain the system stabilization strategy, the local stable points above are screened through an eigenvalue in this embodiment. Specifically, a corresponding eigenvalue of the local stable point is calculated through eigenvalue analysis. When the eigenvalue is negative, the corresponding local stable point is the system stabilization strategy, and the edge cloud service can run stably in a balanced manner at the moment. The system stabilization strategy obtained by calculation is $E_6(1,1,0,0)$, $E_{11}(0,0,1,1)$ and $E_{16}(1,1,1,1)$.

In a case 1, that is, in $E_6(1,1,0,0)$, when $C_{hi}-C_{li}<R+S+R_l$, $N_p<R+S+B_{tq}$, $R_q+S_q-P_i<Rh-RI$, and $R+S<C_{he}-C_{le}$, the costs of provision by the task executor and the cloud platform are less than the revenues obtained. In this case, a corresponding evolution strategy is (credible, credible, non-credible, non-credible), which corresponds to $E_6(1,1,0,0)$, so that the edge cloud service can run continuously and stably. That is, when the task executor selects to provide the high-quality data, the cloud platform selects to provide the strict supervision data, and the task requester selects to provide the false reward data, and when the edge server selects to provide the non-strict supervision data, the edge cloud service can run stably.

In a case 2, that is, in $E_{11}(0,0,1,1)$, when $R+S+Btw<C_{hi}-C_{li}$, $S+B_{tw}<vP_i+N_p$, $R_h-R_l<S_q+R_q$, and $(1-v)P_i<C_{le}+S$, the cost of provision of the high-quality data by the task executor is greater than the reward obtained and the reputation award, and the cost of monitoring of the cloud platform is greater than the reward and the reputation award. In this case, a corresponding evolution strategy is (non-credible, non-credible, credible, credible), which corresponds to $E_{11}(0,0,1,1)$, so that the edge cloud service can run continuously and stably. That is, when the task executor selects to provide the low-quality data, the cloud platform selects to provide the non-strict supervision data, and the task requester selects to provide the true reward data, and when the edge server selects to provide the strict supervision data, the edge cloud service can run stably.

In a case 3, that is, in $E_{16}(1,1,1,1)$, when $C_{hi}-C_{li}<R+S+R_h$, $N_p<R+S$, $R_h-R_l<R_q+S_q$, $(1-v)P_i<C_{le}+S$, the costs of the task executor, the cloud platform, the task requester and the edge server are all less than the revenues obtained. In this case, a corresponding evolution strategy is (credible, credible, credible, credible), which corresponds to $E_{16}(1,1,1,1)$, so that the edge cloud service can run continuously and stably. That is, when the task executor selects to provide the high-quality data, the cloud platform selects to provide the strict supervision data, and the task requester selects to provide the true reward data, and when the edge server selects to provide the strict supervision data, the edge cloud service can run stably.

In order to verify whether the case 1, the case 2 and the case 3 can make the edge cloud service reach a stable and balanced state, the applicant carries out a relevant simulation experiment in this embodiment.

In the experiment, when the task executor provides the high-quality data, the cost is $C_{hi}=22$, the reward obtained is $R_h=34$, and the reputation award is R=8; and when the task executor provides the low-quality data, the cost is $C_{li}=6$, the reward obtained is $R_l=10$, and the reputation loss is S=8. If the task executor colludes with the cloud platform, the cost is $B_{tw}=6$. When the cloud platform selects to provide the strict supervision data, $N_p=14$, the reward $vP_i=12$ paid by the task requester is obtained, and the reputation award R=8 may be obtained, but when the cloud platform selects to provide the non-strict supervision data, the reputation loss is S=8. When the task requester provides the true reward data, the reward given to the cloud platform and the edge server by the task requester is $P_i$, and the reputation award $R_q=8$ is obtained. The revenue brought to the task requester by the provision of the first quality data by the task executor is $O_{ij}=40$, and on the contrary, the loss of the task requester may be $A_g=18$ if a staff provides the low-quality data. When the task requester provides the false reward data, the cost of collusion with the cloud platform is $B_{tq}=6$, and there may also be the reputation loss $S_q=6$. The cost of provision of the strict monitoring data by the edge server is $C_{he}=24$, the reward paid by the task requester is $(1-v)P_i=12$, and the reputation award R=8 is obtained. If the strict monitoring data are provided to make the low-quality data enter a cloud environment service, the cost is $C_{le}=6$, and the reputation loss is S=8. r=m=p=g=0.4.

Figure 2:
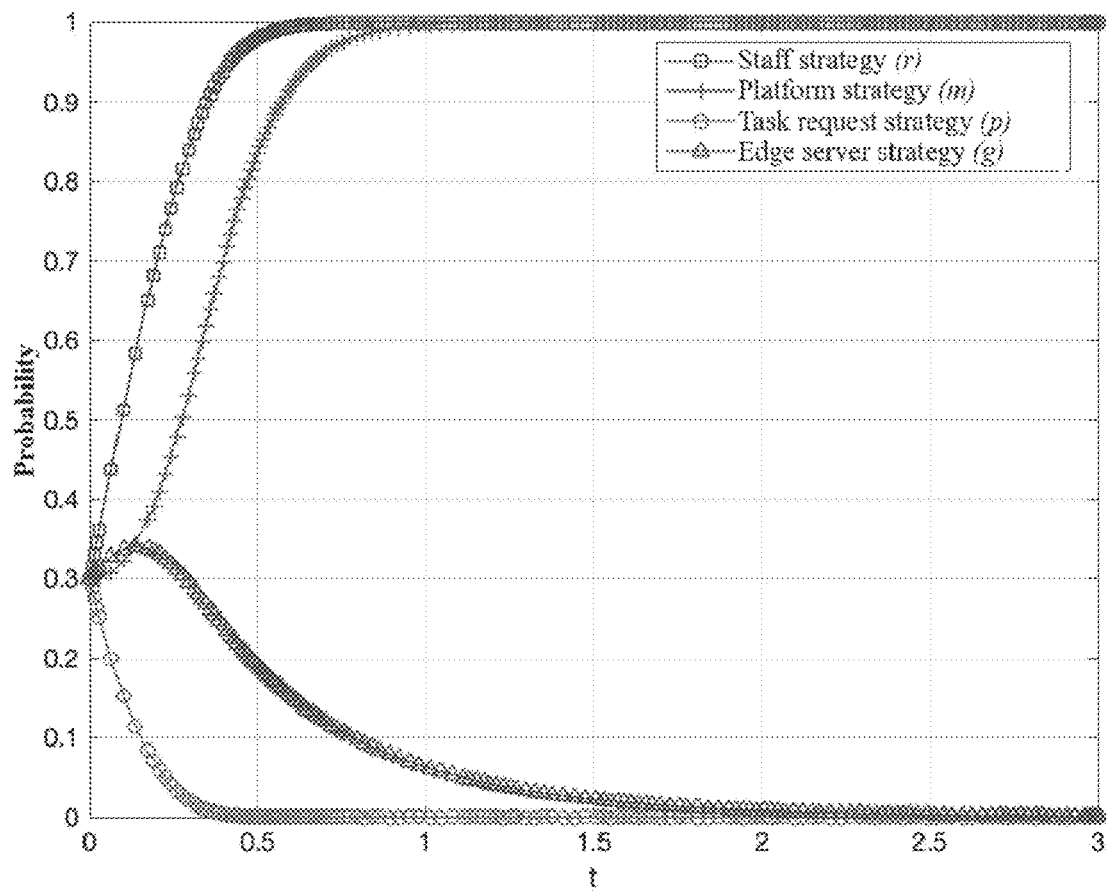
FIG. 2 is an analysis diagram of edge cloud service stability in a case 1 in the embodiment.
Figure 3:
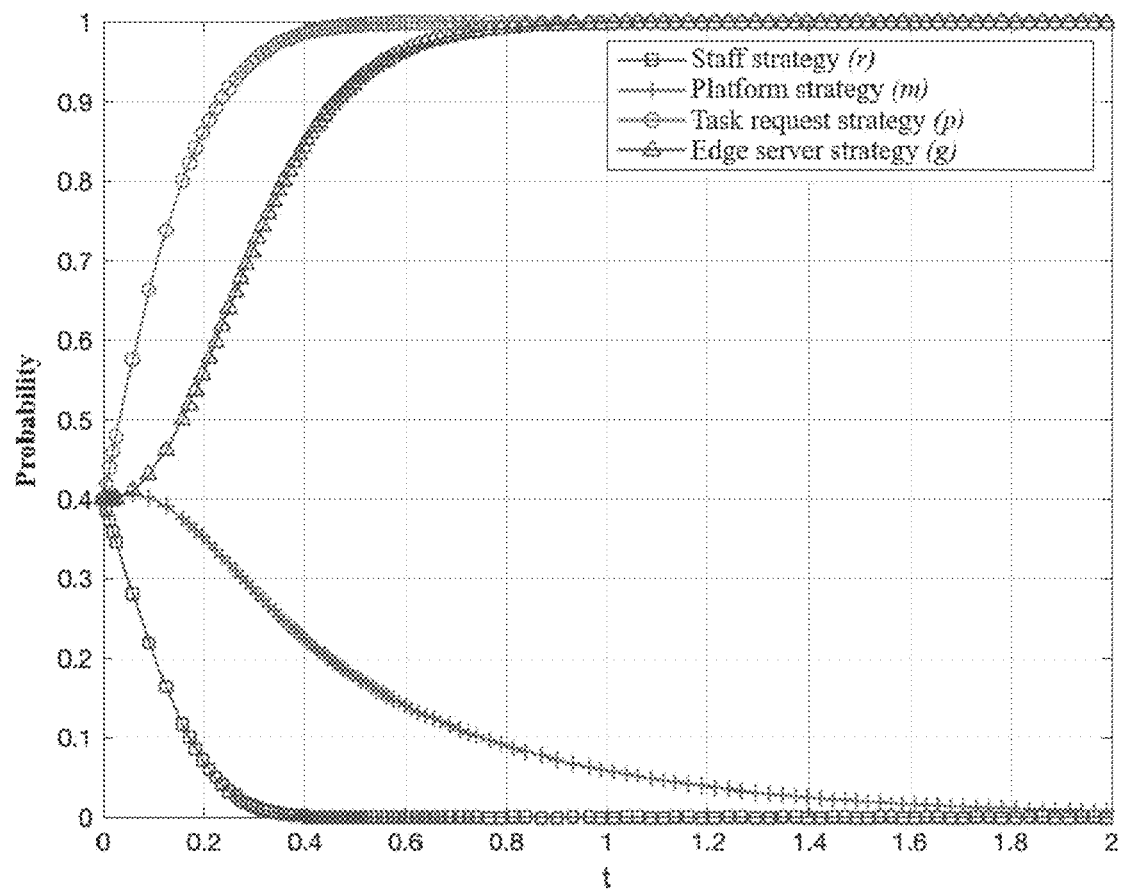
FIG. 3 is an analysis diagram of edge cloud service stability in a case 2 in the embodiment.
Figure 4:
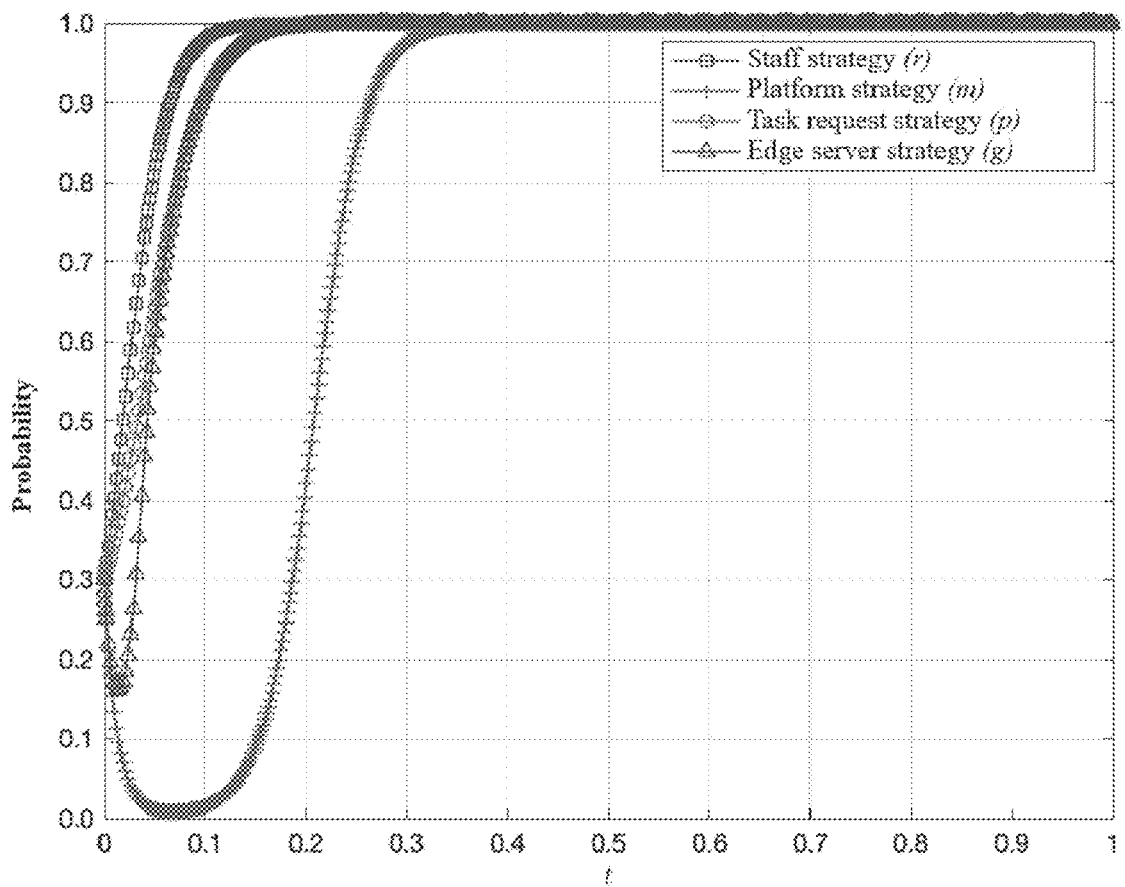
FIG. 4 is an analysis diagram of edge cloud service stability in a case 3 in the embodiment.

The edge cloud environment stability is analyzed through simulation data, experimental results are shown in FIG. 2, FIG. 3 and FIG. 4 respectively, and FIG. 2, FIG. 3 and FIG. 4 are analysis diagrams of the edge cloud service stability in the case 1, the case 2 and the case 3 sequentially.

As can be seen from FIG. 2, in the case 1, the task executor and the cloud platform select to be credible with the passage of time. The task requester and the edge server will tend to select to be non-credible, thus reducing the required cost.

As can be seen from FIG. 3, in the case 2, the task executor and the cloud platform tend to select to be non-credible, while task requester and the edge server select to be credible.

As can be seen from FIG. 4, in the case 3, the task executor, the cloud platform, the task requester and the edge server tend to select to be credible, credible, credible and credible sequentially. Although the cloud platform and the edge server are declined for a short time, the cloud platform and the edge server are eventually converged to 1, because the higher the effort of the staff is, the higher the payment and award of the task are, and a proportion of provision of the high-quality data by the staff is increased gradually, which also leads to the convergence of the probability of selecting the credible strategy by other participants to 1. Considering the individual rationality, all participants may select to be credible when pursuing self-profit maximization for a long-term revenue.

Figure 5:
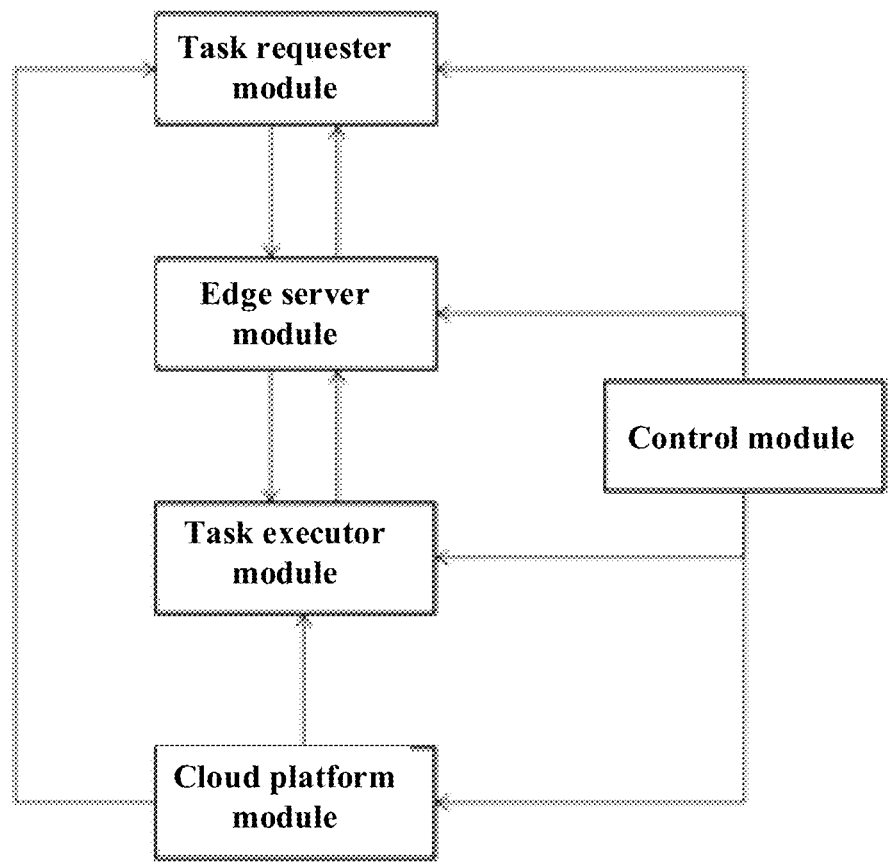
FIG. 5 is a schematic structural diagram of a control system in the embodiment.

This embodiment provides a control system with edge cloud service stability, which, with reference to FIG. 5, comprises:
- a task executor module configured for providing quality data and transmitting the quality data to an edge server;
- a task requester module configured for providing reward data;
- a cloud platform module configured for monitoring the task executor module and the task requester module and providing supervision data;
- an edge server module configured for monitoring the quality data, providing the monitoring data, transmitting the quality data to the task requester module, and transmitting the reward data to the task executor module; and
- a control module configured for generating a system stabilization strategy based on the quality data, the reward data, the supervision data and the monitoring data.

The control module comprises:
- an acquisition module for: acquiring quality data of a task executor, monitoring data of the edge server, reward data of a task requester and supervision data of a cloud platform;
- a replication dynamic equation generation module for: establishing revenue functions of the task executor, the cloud platform, the task requester and the edge server to obtain replication dynamic equations; and
- a system stabilization strategy generation module for: establishing a Jacobian matrix to obtain a system stabilization strategy.

Figure 6:
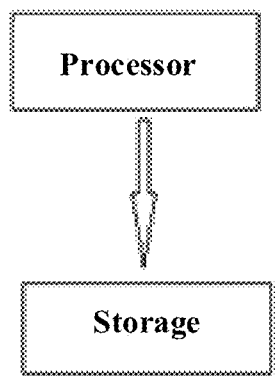
FIG. 6 is a schematic structural diagram of a control device in the embodiment.

This embodiment further provides a control device with edge cloud service stability, which, with reference to FIG. 6, comprises a processor and a storage, wherein when the processor executes a computer program stored in the storage, the control method with edge cloud service stability above.

This embodiment further provides a computer-readable storage medium for storing a computer program, wherein when the computer program is executed by a processor, the control method with edge cloud service stability above.

According to the control method with edge cloud service stability provided by this embodiment, through the combination of the cloud platform and the edge server, a transmission amount of remote data is reduced, a time delay of network transmission is reduced, and an operation cost of the network is reduced while improving a user service quality.

According to the control method with edge cloud service stability provided by this embodiment, four-party game analysis is carried out on the task executor, the cloud platform, the task requester and the edge server for the first time, so that a four-party selection condition of stable operation of an edge cloud service is obtained, which is namely the system stabilization strategy, and a total revenue of the edge cloud service is optimized.

Those described above are only preferred embodiments of the present invention, and are not intended to limit the present invention. Any modifications, equivalent substitutions and improvements made without departing from the spirit and principle of the present invention shall fall within the scope of protection of the present invention.

We claim:

1. A control method with edge cloud service stability, comprising the following steps of:
   first step: acquiring quality data of a task executor, monitoring data of an edge server, reward data of a task requester and supervision data of a cloud platform; wherein, the task requester sends a demand to the edge server, after accepting the demand of the task requester, the edge server transmits the demand to the task executor meeting conditions; after receiving the demand, the task executor transmits the processed quality data to the task requester through the edge server; the edge server monitors the quality data provided by the task executor; and the cloud platform is configured for monitoring whether the task requester and the task executor have a cheating behavior;
   second step: establishing revenue functions of the task executor, the cloud platform, the task requester and the edge server to obtain replication dynamic equations; and
   third step: establishing a Jacobian matrix to obtain a system stabilization strategy based on the replication dynamic equations;
   wherein the system stabilization strategy comprises:
   a case 1 of: acquiring first quality data from the task executor, acquiring first supervision data from the cloud platform, acquiring second reward data from the task requester, and acquiring second monitoring data from the edge server;
   a case 2 of: acquiring second quality data from the task executor, acquiring second supervision data from the cloud platform, acquiring first reward data from the task requester, and acquiring first monitoring data from the edge server; and
   a case 3 of: acquiring first quality data from the task executor, acquiring first supervision data from the cloud platform, acquiring first reward data from the task requester, and acquiring first monitoring data from the edge server; wherein,
   the first quality data are high quality data, and are credible quality data; and the second quality data are low quality data, and are non-credible quality data;
   the first supervision data are strict supervision data, and are credible quality data; and the second supervision data are non-strict supervision data, and are non-credible supervision data;
   the first reward data are true reward data, and are credible reward data; and the second reward data are false reward data, and are non-credible reward data; and
   the first monitoring data are strict monitoring data, and are credible monitoring data; and the second monitoring data are non-strict monitoring data, and are non-credible monitoring data;

wherein the control method is realized when a processor of a control device with edge cloud service stability executes a computer program stored in a storage of the control device.

2. The control method according to claim 1, wherein the operation of the third step specifically comprises: establishing the Jacobian matrix according to the replication dynamic equations of the task executor, the cloud platform, the task requester and the edge server to obtain local stable points, and screening the local stable points to obtain the system stabilization strategy.

3. The control method according to claim 2, wherein the operation of screening the local stable points specifically comprises: calculating a corresponding eigenvalue of the local stable point, and when the eigenvalue is negative, the corresponding local stable point is the system stabilization strategy.

4. The control method according to claim 1, wherein the replication dynamic equations comprise a replication dynamic equation $F(r)$ of the task executor, a replication dynamic equation $F(m)$ of the cloud platform, a replication dynamic equation $F(p)$ of the task requester and a replication dynamic equation $F(g)$ of the edge server, wherein, $$F(r)=dr/dt=r(W_1-\overline{W})=-r(r-1)(C_{li}-C_{hi}+R+S+pB_{tw}+mR_l+pR_h-PR_l-mpB_{tw}+mgR_h-mgR_l-gpR_h+pgR_l-mpR_h+mpR_l+mpgR_h-mpgR_l),$$

$$F(m)=dm/dt=m(C_1-\overline{C})=-m(m-1)(R-N_p+S+pB_{tw}+rB_{tq}-gpr^2-rpB_{tq}-rpB_{tw}-gpR-gvP_i-pvP_i+gpr+rpvP_i+rgpR+gpvP_i+rgvP_i-rgpvP_i),$$

$$F(p)=dp/dt=p(T_1-\overline{T})=-p(p-1)(R_q-P_i+S_q+rB_{tq}+gP_i-gR_h+gR_l+mP_i-mR_q-mS_q+rP_i-rR_h+rR_l-rmB_{tq}-mgP_i+mgR_h-mgR_l-rgP_i+rgR_h-rgR_l-2rmP_i+rmR_q+rmS_q+2rmgP_i-rmgR_h+rmgR_l),$$

$$F(g)=-g(g-1)(Cle-Che+Pi+R+S+mChe-mCle-mPi-mR-mS-pPi-rPi-vPi-rmChe+rmCle+mpPi+rmPi+rmR+rmS+rpPi,+mvPi+pvPi+rvPi-mpvPi-rmvPi-rpvPi-rmpPi+rmpvPi)$$

r is a probability of provision of the first quality data by the task executor, t is time, m is a probability of provision of the first supervision data by the cloud platform, p is a probability of provision of the first reward data by the task requester, g is a probability of provision of the first monitoring data by the edge server, and a range of values of r, m, p and g is [0, 1];

$W_1$ is a revenue of provision of the first quality data by the task executor, and $\overline{W}$ is an average revenue of the task executor;

$C_1$ is a revenue of provision of the first supervision data by the cloud platform, and $\overline{C}$ is an average revenue of the cloud platform;

$T_1$ is a revenue of provision of the first reward data by the task requester, and $\overline{T}$ is an average revenue of the task requester;

$S_1$ is a revenue of provision of the first monitoring data by the edge server, and $\overline{S}$ is an average revenue of the edge server;

R is a reputation award, and S is a reputation loss; $R_h$ is a reward acquired by provision of the first quality data by the task executor, $C_{hi}$ is a cost of provision of the first quality data by the task executor, $R_l$ is a reward acquired by provision of the second quality data by the task executor, and $C_{li}$ is a cost of provision of the second quality data by the task executor; $R_q$ is a reputation award acquired by provision of the first reward data by the task requester, $S_q$ is a reputation loss acquired by provision of the second reward data by the task requester, $P_i$ is a reward given to the cloud platform and the edge server by the task requester, $vP_i$ is a reward given to the cloud platform by the task requester, and $(1-v)P_i$ is a reward given to the edge server by the task requester; and $C_{he}$ is a cost of provision of the first monitoring data by the edge server, $C_{le}$ is a cost of provision of the second monitoring data by the edge server, $B_{tw}$ is a cost of collusion between the task executor and the cloud platform, $B_{tq}$ is a cost of collusion between the task requester and the cloud platform, and Np is a cost of discrimination of the cloud platform.

5. The control method according to claim 4, wherein:

the average revenue of the task executor is $\overline{W}=rW_1+(1-r)W_2$, $$W_1=mpg(R_h+R-C_{hi})+m(1-p)g(R_h+R-C_{hi})+mp(1-g)(R_l+R-C_{hi})+m(1-p)(1-g)(R_l+R-C_{hi})+(1-m)pg(R_h+R-C_{hi})+(1-m)(1-p)(1-g)(R_l+R-C_{hi})$$

$$W_2=mpg(-C_{li}-S)+m(1-p)g(-C_{li}-S)+mp(1-g)(-C_{li}-S)+m(1-p)(1-g)(-C_{li}-S)+(1-m)pg(R_h-C_{li}-S-B_{tw})+(1-m)(1-p)g(R_l-C_{li}-S)+(1-m)p(1-g)(R_l-C_{li}-S-B_{tw})+(1-m)(1-p)(1-g)(R_l-C_{li}-S)$$

wherein $W_1$ is the revenue of provision of the first quality data by the task executor, and $W_2$ is a revenue of provision of the second quality data by the task executor;

the average revenue of the cloud platform is $\overline{C}=mC_1+(1-m)C_2$, $$C_1=rgp(vP_i+R-N_p)+rg(1-p)(vP_i+R-N_p)+r(1-g)p(vP_i+R-N_p)+r(1-g)(1-p)(vP_i+R-N_p)+(1-r)gp(r-N_p)+(1-r)g(1-p)(R-N_p)+(1-r)(1-g)p(R-N_p)+(1-r)(1-g)(1-p)(R-N_p)$$

$$C_2=rgp(vP_i-S)+rg(1-p)(vP_i-S-B_{tq})+r(1-g)p(vP_i-S)+r(1-g)(1-p)(vP_i-S-B_{tq})+(1-r)gp(vP_i-B_{tw}-S)+(1-r)g(1-p)(vP_i-S)+(1-r)(1-g)p(vP_i-B_{tw}-S)+(1-r)(1-g)(1-p)(-S),$$

wherein $C_1$ is the revenue of provision of the first supervision data by the cloud platform, and $C_2$ is a revenue of provision of the second supervision data by the cloud platform;

the average revenue of the task requester is $\overline{T}=pT_1+(1-p)T_2$, $$T_1=rmg(O_{ij}+R_q-P_i-R_h)+r(1-m)g(O_{ij}+R_q-P_i-R_h)+(1-r)(1-m)g(R_q-A_g-P_i-R_h)+rm(1-g)(O_{ij}+R_q-P_i-R_h)+r(1-m)(1-g)(O_{ij}+R_q-P_i-R_h)+(1-r)(1-m)(1-g)(R_q-A_g-P_i-R_l)$$

$$T_2=rmg(O_{ij}-P_i-S_q-R_l)+r(1-m)g(O_{ij}-P_i-B_{tq}-R_l-S_q)+(1-r)(1-m)g(-A_g-P_i-S_q-R_l)+rm(1-g)(Oi_j-S_q-R_l)+r(1-m)(1-g)(O_{ij}-P_i-R_l-S_q-B_{tq})+(1-r)(1-m)(1-g)(-A_g-S_q-R_l)$$

wherein $T_1$ is the revenue of provision of the first reward data by the task requester, $T_2$ is a revenue of provision of the second reward data by the task requester, $O_{ij}$ is a revenue brought to the task requester by the first quality data, and $A_g$ is a loss brought to the task requester by the second quality data; and the average revenue of the edge server is $\overline{S}=gS_1+(1-g)S_2$, $$S_1=rmp[(1-v)P_i+R-C_{he}]+r(1-m)p[(1-v)P_i+R-C_{he}]+(1-r)(1-m)p[(1-v)P_i+R-C_{he}]+rm(1-p)[(1-v)P_i+R-C_{he}]+r(1-m)(1-p)[(1-v)P_i+R-C_{he}]+(1-r)(1-m)(1-p)[(1-v)P_i+R-C_{he}]$$

$$S_2=rmp[(1-v)P_i-S-C_{le}]+r(1-m)p[(1-v)P_i-S-C_{le}]+(1-r)(1-m)p[(1-v)P_i-S-C_{le}]+rm(1-p)[(1-v)P_i-S-C_{le}]+r(1-m)(1-p)[(1-v)P_i-S-C_{le}]+(1-r)(1-m)(1-p)(-S-C_{le}),$$

wherein $S_1$ is the revenue of provision of the first monitoring data by the edge server, and $S_2$ is a revenue of provision of the second monitoring data by the edge server.

* * * * *